(12) United States Patent
Yamaguchi

(10) Patent No.: US 9,964,422 B2
(45) Date of Patent: May 8, 2018

(54) AIRFLOW METER

(71) Applicant: DENSO CORPORATION, Kariya, Aichi-pref. (JP)

(72) Inventor: Junzo Yamaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 318 days.

(21) Appl. No.: 14/963,784

(22) Filed: Dec. 9, 2015

(65) Prior Publication Data

US 2016/0161313 A1   Jun. 9, 2016

(30) Foreign Application Priority Data

Dec. 9, 2014   (JP) .................................. 2014-249237

(51) Int. Cl.
| | |
|---|---|
| *G01F 1/684* | (2006.01) |
| *F02D 41/18* | (2006.01) |
| *G01F 1/69* | (2006.01) |
| *G01F 1/696* | (2006.01) |
| *G01F 1/72* | (2006.01) |
| *G01F 5/00* | (2006.01) |
| *G01F 15/02* | (2006.01) |
| *G01K 13/02* | (2006.01) |

(52) U.S. Cl.
CPC .............. *G01F 1/684* (2013.01); *F02D 41/18* (2013.01); *G01F 1/69* (2013.01); *G01F 1/696* (2013.01); *G01F 1/72* (2013.01); *G01F 5/00* (2013.01); *G01F 15/024* (2013.01); *G01K 13/02* (2013.01); *F02D 2200/0414* (2013.01); *F02D 2200/0418* (2013.01); *G01F 1/6842* (2013.01); *G01K 2013/024* (2013.01)

(58) Field of Classification Search
CPC .......... G01F 5/00; G01F 1/6842; G01F 1/684; G01F 1/696; G01F 1/69; G01F 15/024; G01F 1/72; F02D 41/187; F02D 2200/0414; F02D 2200/0418; F02D 41/18; F02M 35/10386; F02M 13/02; F02M 2013/024; G01K 13/02; G01K 2013/024

See application file for complete search history.

(56) References Cited

U.S. PATENT DOCUMENTS

| | | | | |
|---|---|---|---|---|
| 8,091,413 | B2 * | 1/2012 | Saito ..................... | G01F 1/6842 73/114.33 |
| 8,215,160 | B2 * | 7/2012 | Saito ..................... | F02D 41/187 73/114.34 |
| 8,468,883 | B2 * | 6/2013 | Sakuma ................ | G01F 1/6842 73/204.26 |

(Continued)

FOREIGN PATENT DOCUMENTS

| | | |
|---|---|---|
| JP | 3-144355 | 6/1991 |
| JP | 4-328459 | 11/1992 |

(Continued)

*Primary Examiner* — Freddie Kirkland, III
(74) *Attorney, Agent, or Firm* — Nixon & Vanderhye P.C.

(57) ABSTRACT

An airflow meter includes a flow rate sensor for measuring a flow rate of intake air sucked into an engine, a humidity sensor that outputs an intake air humidity signal in accordance with humidity of the intake air, an intake air temperature sensor that outputs an intake air temperature signal in accordance with temperature of the intake air, and a humidity correction section that corrects the intake air humidity signal based on the intake air temperature signal.

4 Claims, 6 Drawing Sheets

(56) References Cited

U.S. PATENT DOCUMENTS

| | | | |
|---|---|---|---|
| 8,549,901 B2* | 10/2013 | Saito | F02D 41/187 |
| | | | 73/114.33 |
| 8,573,041 B2* | 11/2013 | Saito | G01F 1/6842 |
| | | | 73/114.32 |
| 8,701,475 B2* | 4/2014 | Kohno | G01F 1/684 |
| | | | 73/114.33 |
| 9,279,709 B2* | 3/2016 | Etherington | G01F 1/6842 |
| 2011/0072894 A1* | 3/2011 | Saito | F02D 41/187 |
| | | | 73/114.34 |
| 2013/0036806 A1* | 2/2013 | Kohno | G01F 1/684 |
| | | | 73/114.33 |
| 2015/0308392 A1* | 10/2015 | Sudou | F02M 35/10386 |
| | | | 73/114.32 |
| 2016/0011031 A1* | 1/2016 | Asano | G01F 1/692 |
| | | | 73/114.34 |
| 2016/0146651 A1* | 5/2016 | Isoya | G01F 1/684 |
| | | | 73/114.34 |
| 2017/0059381 A1* | 3/2017 | Ban | G01F 1/696 |

FOREIGN PATENT DOCUMENTS

| | | |
|---|---|---|
| JP | 7-128293 | 5/1995 |
| JP | 8-122163 | 5/1996 |
| JP | 2010-151795 | 7/2010 |
| JP | 2011-112569 | 6/2011 |
| JP | 2012-167972 | 9/2012 |

\* cited by examiner

AIRFLOW METER

This application claims priority to Japanese Patent Application No. 2014-249237 filed on Dec. 9, 2014, the entire contents of which are hereby incorporated by reference.

BACKGROUND OF THE INVENTION

1. Field of the Invention

The present invention relates to an airflow meter provided with a humidity sensor for detecting the humidity of intake air sucked into an internal combustion engine.

2. Description of Related Art

Recently, there is an increasing need to detect the humidity of intake air sucked into an internal combustion engine for, the purpose of increasing the fuel economy and cleaning the exhaust gas of the engine. It is known to mount a humidity sensor on an airflow meter to measure not only the flow rate of intake air but also the humidity of the intake air. For example, refer to Japanese Patent Application Laid-open No. 2010-151795.

However, the humidity of intake air cannot be correctly measured by such an airflow meter if the temperature of an intake duct on which the airflow meter is mounted increases due to heat of an engine, causing the temperature of the humidity sensor to increase excessively, even when the temperature of the intake air is low.

To deal with this problem, the airflow meter described in the above patent document has a structure in which a measurement chamber is provided in the center area of the intake duct so as to be located more distant from the inner wall of the intake duct than the flow rate sensor of the airflow meter is, and the humidity sensor is disposed within the measurement chamber in order to reduce the amount of the heat transmitted from the inner wall of the intake duct to the humidity sensor. However, this structure has a problem in that since the humidity sensor is disposed in the center area of the intake duct, the structural flexibility of the airflow meter is considerably lowered.

In addition, since the flow velocity is high in the center area of the intake duct, the humidity sensor disposed in the center area of the intake duct is subjected to a large amount of dust and water, and as a result, is easily dirtied. To keep the humidity sensor clean, it may occur that the humidity sensor is disposed in the inner passage of the airflow meter. However, in this case, since the heat being received by the intake duct transmits to the member which forms the inner passage, causing the temperature of the inner passage to increase, there is a concern that the temperature of the humidity sensor may change, as a result of which the accuracy of the humidity detection may be lowered.

SUMMARY

An exemplary embodiments provides an airflow meter including:

a flow rate sensor for measuring a flow rate of intake air sucked into an engine;

a humidity sensor that outputs an intake air humidity signal in accordance with humidity of the intake air;

an intake air temperature sensor that outputs an intake air temperature signal in accordance with temperature of the intake air; and a humidity correction section that corrects the intake air humidity signal based on the intake air temperature signal.

According to the exemplary embodiment, there is provided an airflow meter the installation restriction of whose humidity sensor is small and the measurement accuracy of whose humidity sensor is high.

Other advantages and features of the invention will become apparent from the following description including the drawings and claims.

PREFERRED EMBODIMENTS OF THE INVENTION

First Embodiment

Figure 1A:
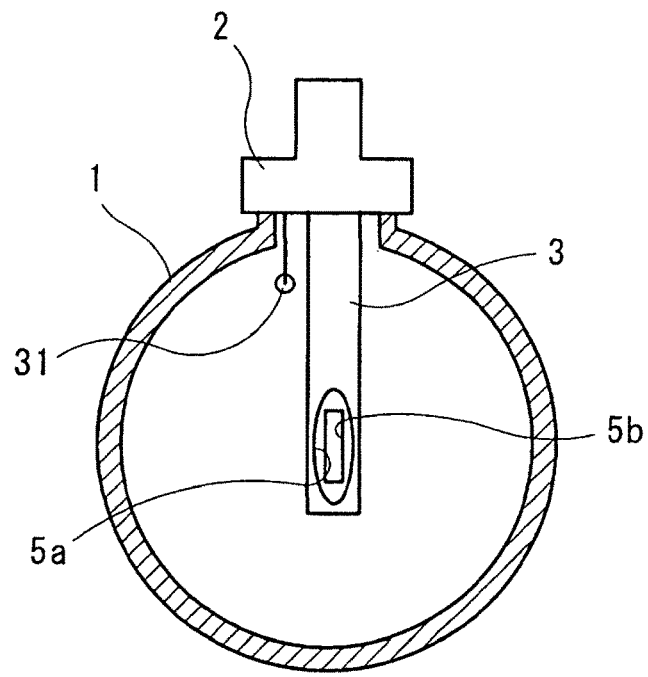
FIG. 1A is a diagram schematically showing an airflow meter according to a first embodiment of the invention as viewed from the upstream side of intake air.
Figure 1B:
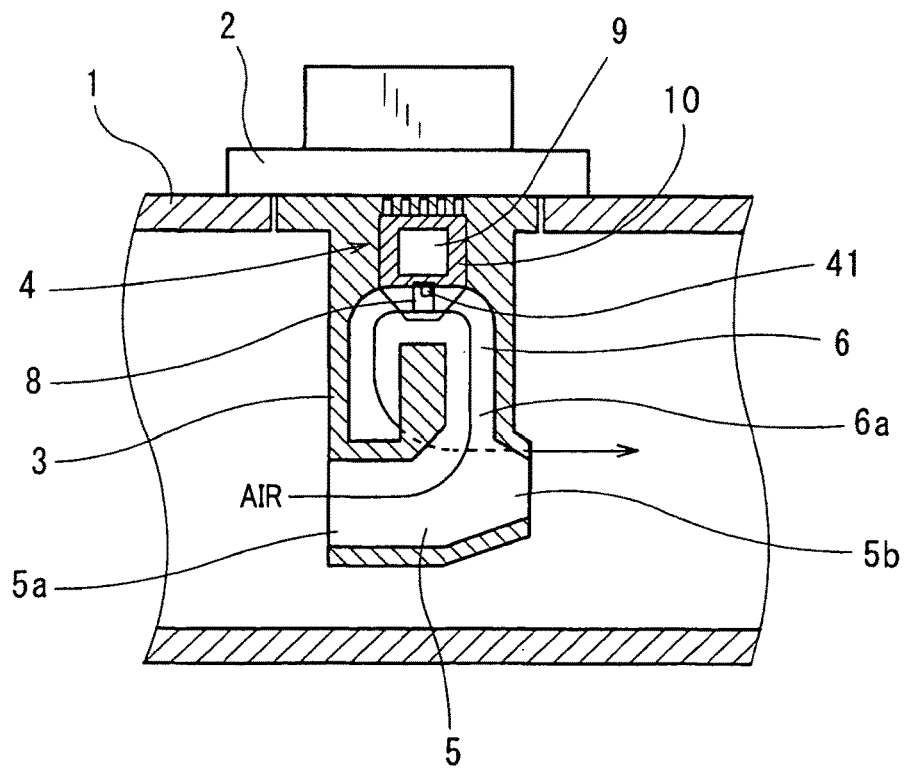
FIG. 1B is a schematic sectional view of the airflow meter according to the first embodiment.
Figure 2:
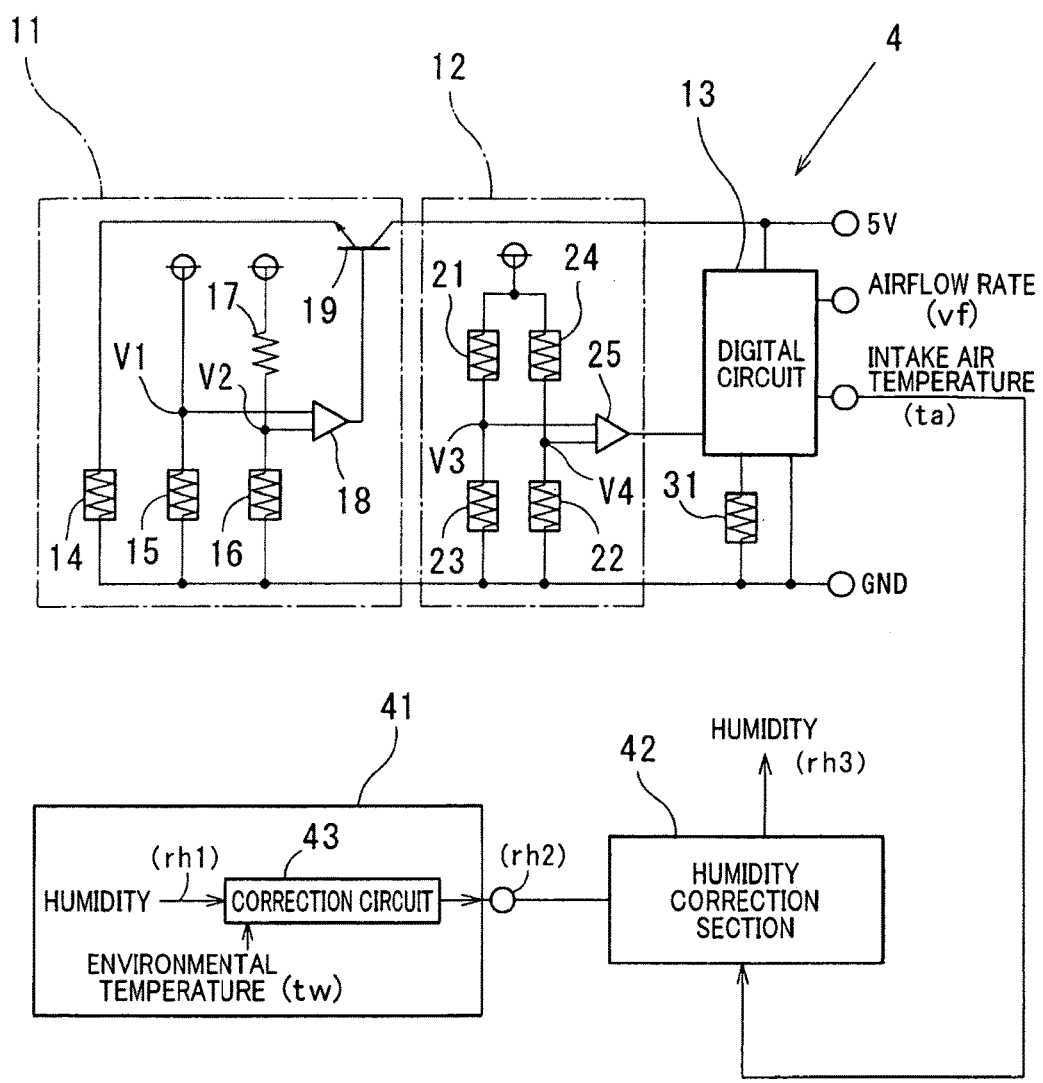
FIG. 2 is a schematic diagram of the electric circuit included in the airflow meter.

An airflow meter according to a first embodiment of the invention is described with reference to FIGS. 1 to 5. The airflow meter is mounted on an intake duct 1 (an outlet or an intake tube of an air cleaner, for example) for guiding intake air (combustion air) to a vehicle driving engine. The airflow meter is used for at least measuring the amount of intake air (air flow rate).

The airflow meter includes a passage forming member 3 provided with a lid part 2, and a flow rate sensor 4 disposed inside the passage forming member 3.

The intake duct 1 is formed with a mounting hole for mounting the airflow meter. To mount the airflow meter on the intake duct 1, the passage forming member 3 is inserted into the intake duct 1 from this mounting hole, and then the mounting hole is closed by the lid part 2. Thereafter, lid part 2 is fixed to the intake duct 1 using tapping screws or the like.

Within the passage forming member 3, which is made of resign material, for example, there are formed a bypass air passage 5 and a sub-bypass passage 6 through which part of intake air passing through the inside of the air duct 1 as a main air passage flows.

The bypass passage 5 is formed inside the intake duct 1 so as to extend along the flow direction of the intake air. An air inlet opening 5a is provided upstream of the bypass passage 5, and an air outlet opening 5b is provided downstream of the bypass passage 5. The air outlet opening 5b is formed with an outlet orifice for restricting the air flow passing through the bypass, passage 5.

The sub-bypass passage 6 is provided with an entrance 6a into which part the airflow restricted by the outlet orifice flows, and an exit (not shown) for returning the airflow passing out the sub-bypass passage 6 into the intake duct 1. The sub-bypass passage 6 serves as a detour which diverts the air flowing in through the entrance 6a within the passage forming member 3, and returns it into the intake duct 1. In this embodiment, the sub-bypass passage 6 is provided with its own exit (not show). However, the exit may be formed so as to open into the bypass passage 5 so that the airflow passing out the sub-bypass passage 6 is returned to the bypass passage 5.

The lid part 2 provided integrally with the passage forming member 3 includes a connector for connection with an ECU (engine control unit). The lid part 2 and the passage forming member 3 are made of the same resin material.

The flow rate sensor 4, which is disposed as an assembly within the passage forming member 3, includes a sensor board 8 on which a flow detection section 7 for measuring the amount of the intake air is provided, a sensor circuit 9 electrically connected to the ECU through the connector formed in the passage forming member 3, and a circuit housing 10 accommodating the sensor circuit 9.

The flow rate sensor 4 is of the thermal type that measures an amount of intake air based on heat. The flow sensor 4 includes a heater control bridge 11 which heats part of the intake air, a flow rate detection bridge 12 which generates a flow rate signal in accordance with the flow rate of the heated intake air, and a digital circuit 13 which performs a flow calculation based on the flow rate signal.

The heater control bridge 11 includes three resistors provided on the sensor board 8, and two amplification sections provided in the sensor circuit 9.

The three resistors of the heater control bridge 11 function as a heater 14 which generates heat when supplied with a current for heating part of the air passing through the sub-bypass passage 6, an indirect heating resistor 15 which is disposed in the vicinity of the heater 14 and generates a voltage V1 in accordance with the temperature of the intake air heated by the heater 14, and an intake air temperature resistor 16 for measuring the temperature of the non-heated intake air (the intake air not heated by the heater 14). The intake air temperature resistor 16 is series-connected to a voltage division resistor 17 to generate a voltage V2 in accordance with the temperature of the not heated intake air.

The amplification section included in the heater control bridge 11 is constituted of an operational amplifier 18 which generates an output in accordance with the voltage difference between the voltage V1 and the voltage V2, and a transistor 19 which supplies a current in accordance with the output of the operational amplifier 18 to the heater 14. The temperature of the heater 14 can be kept at a reference temperature by keeping the voltage difference between the voltage V1 and the voltage V2 at a predetermined value.

The flow rate detection bridge 12 includes four resistors provided on the sensor board 8, and an amplification section provided in the sensor circuit 9.

The four resistors of the flow rate detection bridge 12 include first and second upstream resistors 21 and 22 disposed on the upstream side of the heat generating section (heater 14 and indirect heating resistor 15), and first and second downstream resistors 23 and 24 disposed on the downstream side of the heat generating section. The first upstream resistor 21 and the first downstream resistor 23 are connected in series to each other to generate a voltage V3 in accordance with an amount of the intake air. Likewise, the second upstream resistor 22 and the second downstream resistor 24 are connected in series to each other to generate a voltage V4 in accordance with the amount of intake air.

When air flows through the sub-bypass passage 6, there occurs a difference between the temperature detected by the first and second upstream resistors 21 and 22 and the temperature detected by the first and second downstream resistors 23 and 24. This temperature difference depends on the amount of the intake air and the flow direction of the intake air. Accordingly, the amount and the flow direction of the intake air can be detected based on this temperature difference. Specifically, when there occurs a difference between the temperature detected by the first and second upstream resistors 21 and 22 and the temperature detected by the first and second downstream resistors 23 and 24, since the resistance of the first and second upstream resistors 21 and 22 and the resistance of the first and second downstream resistors 23 and 24 change, the voltage V3 and V4 change accordingly.

The amplification section of the flow detection bridge 12 includes an operational amplifier 25 which generates an output (flow rate signal) in accordance with the difference between the voltages V3 and the voltage V4.

The digital circuit 13 corrects the flow rate signal outputted form the flow detection bridge 12 by a correction value stored in a memory, and outputs a corrected flow rate signal of which has been subjected to frequency modulation.

The airflow meter according to this embodiment includes an intake air temperature sensor 31 for measuring the temperature of the intake air passing through the intake duct 1 (the temperature of the intake air sucked into the engine). As shown in FIG. 1A, the intake air temperature sensor 31 is disposed outside the passage forming member 3, and measures the temperature of the intake air flowing inside the intake duct 1. More specifically, the intake air temperature sensor 31 is disposed at a position distant from the passage forming member 3 by a predetermined distance so that it is not affected by the heat of the passage forming member 3 as much as possible.

In this embodiment, the intake air temperature sensor 31 is a bobbin-shaped thermistor device including a thermistor element whose resistance changes in accordance with temperature, and two lead wires extending from the thermistor element. The two lead wires are supported by the lid part 2 or the passage forming member 3 so that the thermistor element is located at the position distant from the passage forming member 3 by the predetermined distance. The intake air temperature sensor 31 generates an intake temperature signal to in accordance with the temperature of the intake air. The intake air temperature signal to is outputted to the ECU after having been subjected to frequency modulation in the digital circuit 13 like the flow rate signal vf.

The airflow meter according to this embodiment is configured to measure the humidity of the intake air sucked into the engine, and outputs a humidity signal indicating the measured humidity to the ECU. Specifically, the airflow meter further includes a humidity sensor 41 which outputs an intake air humidity signal in accordance with the humidity of the intake air sucked in to the engine, and a humidity correction section 42 which corrects the intake air humidity signal in accordance with the intake air temperature signal to received from the intake air temperature sensor 31.

The humidity sensor 41 is disposed within the sub-bypass passage 6 in a state of being mounted on the flow rate sensor 4. The humidity sensor 41 is located at a position on the surface of the sensor board 8 and exposed to the intake air.

Figure 3:
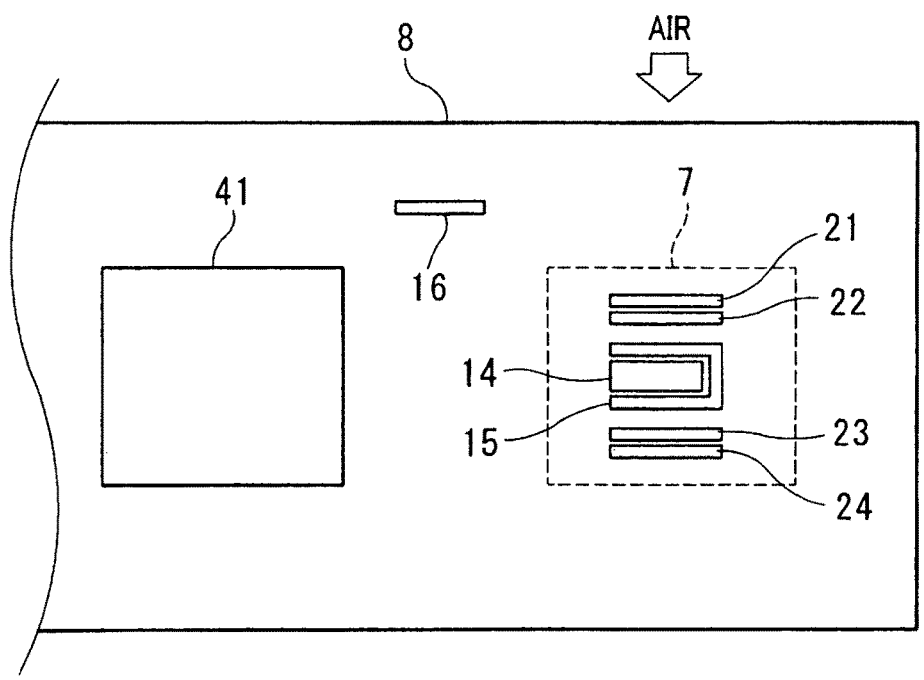
FIG. 3 is a schematic diagram showing a sensor board included in the airflow meter according to the first embodiment.

The humidity sensor 41 is provided so at to measure the intake air which is not heated by the heater 41. In this embodiment, as shown in FIG. 3, the humidity sensor 41 is disposed alongside the flow rate detection section 7 with respect to the flow direction of the intake air on the surface of the sensor board 8 in order to measure the humidity of the intake air not affected by the heater 14.

The humidity sensor 41 is of the electrostatic capacitance type, and incorporates a correction circuit for correcting the measured humidity in accordance with the environmental temperature (the temperature of the position where the humidity sensor 41 is located). In this embodiment, the humidity sensor 41 includes a humidity detection section which is located at a position exposed to the air flowing through the sub-bypass passage 6 and whose electrostatic capacitance varies depending on the relative humidity of the air contacting the humidity detection section, an amplification section which converts the electrostatic capacitance to a humidity signal (voltage signal) rh1, an environmental temperature sensor which is provided in the circuit of the humidity sensor 41 and measures the environmental temperature tw of the humidity sensor 41, and an internal correction circuit 43 which corrects the humidity signal rh1 in accordance with the environmental temperature tw, and outputs a corrected humidity signal rh2.

In this embodiment, the humidity sensor 41 is disposed within the sub-bypass passage 6 for the purpose of suppressing staining of the humidity sensor 41. Therefore, since the heat of the intake duct 1 is transmitted to the passage forming member 3, causing the temperature of the humidity sensor 41 to increase, as a result of this the accuracy of detection of the humidity of the intake air may be lowered.

Accordingly, in this embodiment, the humidity correction section 42 corrects the humidity signal rh2 outputted from the humidity sensor 41 in accordance with the intake air temperature signal ta outputted from the intake air temperature sensor 31. That is, since the humidity signal rh2 outputted from the humidity sensor 41 is corrected in accordance with the intake air temperature signal ta indicating the temperature of the intake air not affected by the heat transmission from the intake duct 1, a humidity signal rh3 not affected by the heat transmission can be obtained.

Figure 4:
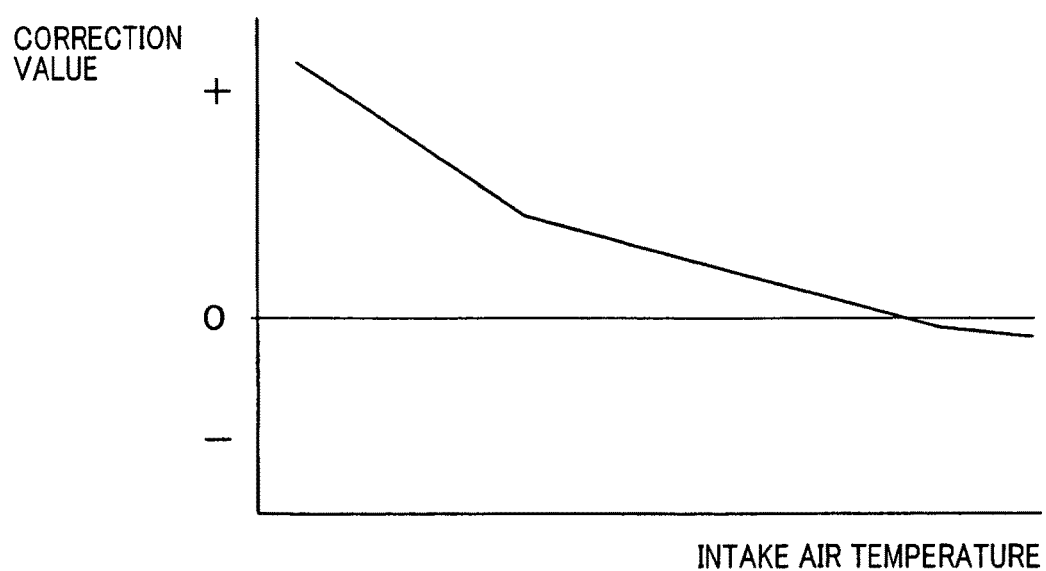
FIG. 4 is a diagram showing a relationship between a correction value for correcting measurement of humidity and the temperature of the intake air.

Specifically, the humidity correction section 42 determines a correction value in accordance with the intake air temperature signal ta, and obtains the humidity signal rh3 by adding the correction value to the humidity signal rh2. As shown in FIG. 4, the correction value is large when the temperature of the intake air is low, and decreases with the increase of the temperature of the intake air. The correction value may be obtained from a map, or from a predetermined numerical expression. The humidity signal rh3 is outputted to the ECU after having been subjected to frequency modulation like the flow rate signal of and intake air temperature signal ta.

Advantageous Effect 1 of the First Embodiment

The airflow meter according to the first embodiment includes the humidity sensor 41 and is configured to output the humidity signal rh3 indicating the humidity of the intake air not affected by the heat transmission by correcting the humidity signal rh2 outputted from the humidity sensor 41 using the intake air temperature signal ta outputted from the intake air temperature sensor 31 mounted on the airflow meter. Therefore, according to this embodiment, it is possible to correctly measure the humidity of the intake air free from the effect of the heat transmission from the engine and so on, even if the humidity sensor receives the effect of the heat transmission.

Next, the advantages of the first embodiment are explained with reference to FIG. 5.

Figure 5:
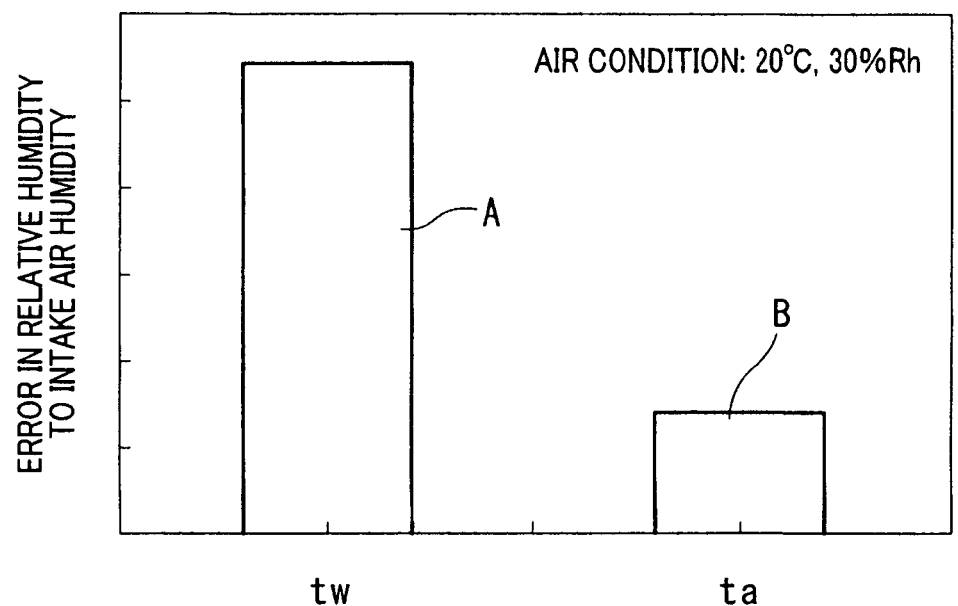
FIG. 5 is a graph for explaining an advantage in humidity measurement accuracy of the airflow meter according to the first embodiment.

(i) In a case where the humidity sensor 41 is disposed within the sub-bypass passage 6 without the provision of the humidity correction section 42, even if the humidity signal rh1 is corrected in accordance with the environmental temperature tw, the corrected humidity signal rh2 involves a large measurement error in relative humidity to the humidity of the intake air as shown by A in FIG. 5.

(ii) On the other hand, in the case of the first embodiment of the invention in which the humidity sensor 41 is disposed within the sub-bypass passage 6 with the provision of the humidity correcting section 42, since the humidity signal rh2 is corrected in accordance with the intake air temperature signal ta which is not affected by the heat transmission, a measurement error can be reduced to one quarter of that in the case where the humidity correcting section 42 is not provided.

According to this embodiment, since the detection accuracy of the humidity of the intake air can be increased irrespective of the heat transmission from the intake duct 1 to the humidity sensor 41, the installation restriction of the humidity sensor 41 can be lessened. Hence, the humidity sensor 41 can be disposed within the passage forming member 3 where it is susceptible to the heat transmission. That is, it is possible to increase the detection accuracy of the humidity of the intake air even if the humidity sensor is disposed within the sub-bypass passage 6 of the airflow meter for the purpose of suppressing the humidity sensor 41 from being stained.

Meanwhile, the need to measure the humidity of intake air sucked into an engine is increasing recently to increase fuel economy of vehicles and to clean vehicle exhaust emissions. To address this need, if the flow rate sensor 4 and the humidity sensor 41 are integrated with each other, since the manufacturing process of the airflow meter becomes complicated, the airflow meter becomes expensive.

As described above, the airflow meter according to this embodiment can be obtained by only assembling the humidity correction section 42 to the combination of a general humidity sensor and a general airflow meter. Accordingly, according to this embodiment, it is possible to provide the high-performance composite airflow meter at a low cost, in which the flow rate sensor 4 and the humidity sensor 41 are integrated.

Second Embodiment

Figure 6A:
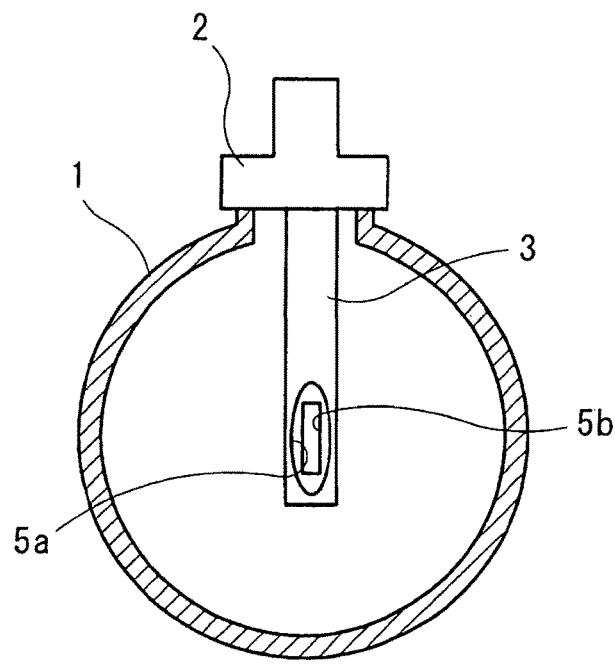
FIG. 6A is a diagram schematically showing an airflow meter according to a second embodiment of the invention as viewed from the upstream side of intake air.

Next, a second embodiment of the invention is described with reference to FIGS. 6 and 7. In the first embodiment, the humidity sensor 41 is mounted on the airflow meter in which the intake air temperature sensor 31 is disposed outside the passage forming member 3. In the second embodiment, the humidity sensor 41 is mounted on the airflow meter in which the intake temperature sensor 31 is provided on the sensor board 8.

Figure 7:
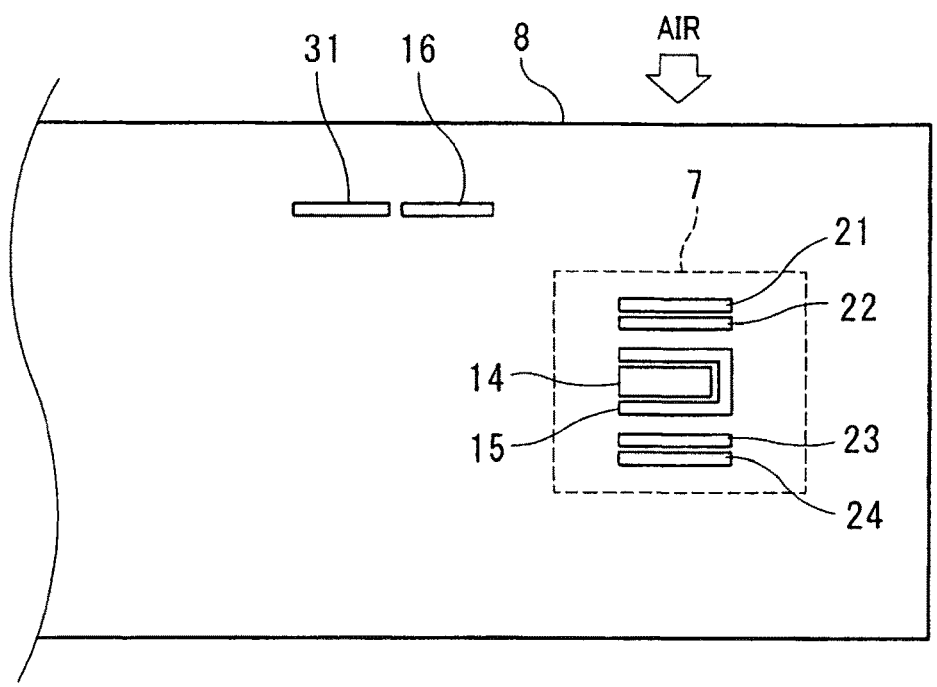
FIG. 7 is a schematic diagram showing a sensor board included in the airflow meter according to the second embodiment.

As shown in FIG. 7, there is known an airflow meter of the type in which the intake air temperature sensor 31 is provided on the sensor board 8 disposed within the sub-bypass passage 6 for measuring the temperature of the intake air not heated by the heater 14 separately from the intake air temperature resistor 16. In the second embodiment, the humidity signal rh2 outputted from the humidity sensor 41 is corrected in accordance with the intake air temperature signal ta outputted from the intake temperature sensor 31 provided on the sensor board 8. The second embodiment provides similar advantages to those provided by the first embodiment.

Incidentally, the intake air temperature signal ta outputted from the intake air temperature sensor 31 is affected by the heat transmission from the passage forming member 3. The effect of the heat transmission on the intake air temperature sensor 31 is smaller than that on the incorporated temperature sensor. Accordingly, the humidity signal rh2 outputted from the humidity sensor 41 may be corrected in accordance with both the difference (ta-tw) between the intake air temperature signal ta outputted from the intake air temperature sensor 31 and the environmental temperature tw measured by the incorporated temperature sensor, and the intake air flow rate signal vf.

Figure 6B:
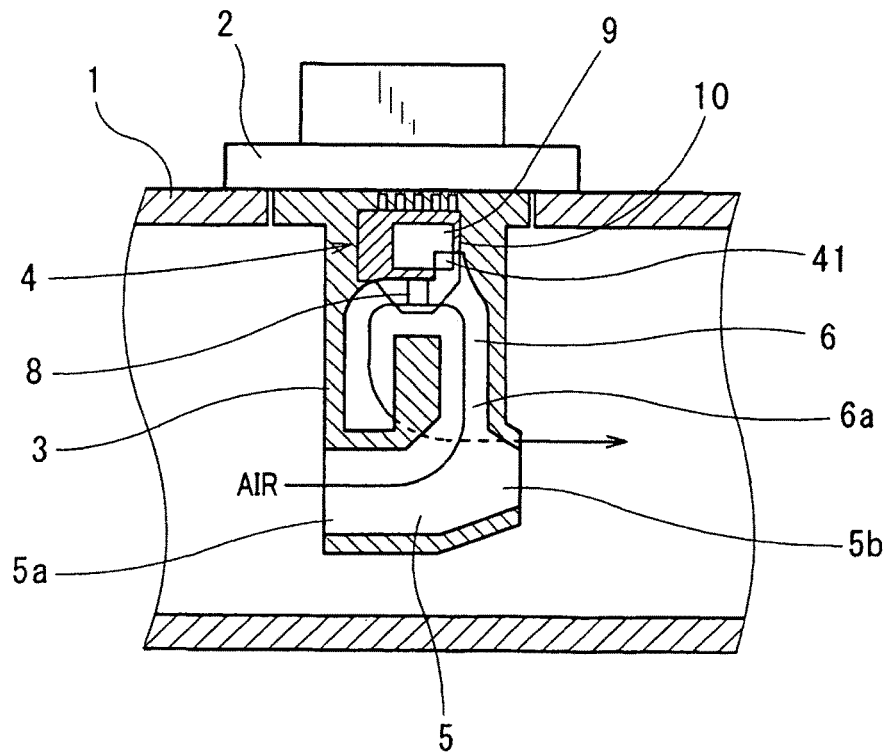
FIG. 6B is a schematic sectional view of the airflow meter according to the second embodiment.

In the second embodiment, the humidity sensor 41 is disposed at a place different from the place at which the humidity sensor 41 is disposed in the first embodiment, such that the humidity sensor 41 is exposed to the intake air on the surface of the circuit housing 10 or in the sensor circuit 9. The humidity sensor 41 is for measuring the humidity of the intake air not heated by the heater 14. In this embodiment, as shown in FIG. 6B, the humidity sensor 41 is disposed in a recess formed in the inner wall of the sub-bypass passage 6 to measure the humidity of the intake air not heated by the heater 14. It is a matter of course that various modifications can be made to the above described embodiments as described below.

In the above embodiments, the intake air temperature sensor 31 is provided separately from the intake air temperature resistor 16. However, the above embodiments may be modified to obtain the intake air temperature signal to from the intake air temperature resistor 16. In this case, the humidity signal outputted from the humidity sensor 41 can be corrected in accordance with the intake air temperature signal outputted from the intake air temperature resistor 16 without the provision of the intake air temperature sensor 31.

In the above embodiments, the flow rate detection section 7 is of the chip type provided on the sensor board 8. However, the flow rate detection section 7 may be constituted of a bobbin type-resistor.

The airflow meters according to the above embodiments have the structure in which two air passages (the bypass passage 5 and the sub-bypass passage 6) are formed within the passage forming member 3. However, the present invention can be applied to an airflow meter in which only one air passage is formed within the passage forming member 3.

In the above embodiments, the flow direction of the air passing the flow rate detection section 7 is opposite to the flow direction of the air flowing through the intake air duct 1. However, the above embodiments may be modified such that the flow direction of the air passing the flow rate detection section 7 is the same as or perpendicular to the flow direction of the air flowing through the intake air duct 1.

The above explained preferred embodiments are exemplary of the invention of the present application which is described solely by the claims appended below. It should be understood that modifications of the preferred embodiments may be made as would occur to one of skill in the art.

What is claimed is:

1. An airflow meter comprising:
   a flow rate sensor for measuring a flow rate of intake air sucked into an engine;
   a humidity sensor that outputs an intake air humidity signal in accordance with humidity of the intake air;
   an intake air temperature sensor that outputs an intake air temperature signal in accordance with temperature of the intake air; and
   a humidity correction section that corrects the intake air humidity signal based on the intake air temperature signal.

2. The airflow meter according to claim 1, further comprising a passage forming member that forms a passage through which part of the intake air flows, the flow rate sensor being disposed within the passage forming member, the intake air temperature sensor being disposed outside the passage forming member.

3. The airflow meter according to claim 1, further comprising passage forming member that forms a passage through which part of the intake air flows, the flow rate sensor being disposed within the passage forming member, the intake air humidity sensor being disposed on a sensor board disposed inside the passage.

4. The airflow meter according to claim 1, further comprising a passage forming member that forms a passage through which part of the intake air flows, the intake air humidity sensor being disposed inside the passage formed within the passage forming member.

* * * * *